(12) United States Patent
Nguyen

(10) Patent No.: US 8,025,278 B2
(45) Date of Patent: Sep. 27, 2011

(54) METHOD AND APPARATUS FOR FABRICATING A PLURALITY OF TURBINE COMPONENTS

(75) Inventor: Son Huu Nguyen, Houston, TX (US)

(73) Assignee: General Electric Company, Schenectady, NY (US)

( * ) Notice: Subject to any disclaimer, the term of this patent is extended or adjusted under 35 U.S.C. 154(b) by 1183 days.

(21) Appl. No.: 11/742,846

(22) Filed: May 1, 2007

(65) Prior Publication Data

US 2008/0271315 A1    Nov. 6, 2008

(51) Int. Cl.
*B25B 1/22* (2006.01)
(52) U.S. Cl. .................. 269/71; 269/289 R; 269/307
(58) Field of Classification Search .............. 269/71, 269/72–75, 95, 289 R, 307
See application file for complete search history.

(56) References Cited

U.S. PATENT DOCUMENTS

| | | | |
|---|---|---|---|
| 2,497,733 A | 2/1950 | Kebour | |
| 3,967,816 A * | 7/1976 | Ramsperger et al. | 269/9 |
| 4,073,215 A * | 2/1978 | Coope et al. | 409/219 |
| 4,157,819 A * | 6/1979 | Meyer | 269/231 |
| 4,496,165 A * | 1/1985 | Schrekeis et al. | 279/46.6 |
| 4,794,687 A * | 1/1989 | Peters et al. | 29/559 |
| 5,152,643 A | 10/1992 | Mcgettigan | |
| 5,423,641 A | 6/1995 | Balough | |
| 5,438,756 A | 8/1995 | Halchak et al. | |
| 5,897,108 A * | 4/1999 | Gordon et al. | 269/50 |
| 6,138,726 A | 10/2000 | Newman | |
| 6,279,888 B1 * | 8/2001 | Wal, III | 269/37 |
| 6,402,468 B1 | 6/2002 | Florin et al. | |
| 6,554,265 B2 * | 4/2003 | Andronica | 269/268 |
| 2008/0271315 A1 * | 11/2008 | Nguyen | 29/889.2 |

FOREIGN PATENT DOCUMENTS

CA    2308561 A1    11/2001

OTHER PUBLICATIONS

Department of the Navy, Naval Sea Systems Command Technical Directive for (GTC) NR. 21, Installation of Split Outer Combustion Case, Issued Dec. 3, 1998, Ser.: 03Z13/0368; 29 pages.
European Search Report EP 08154978 Dated Sep. 9, 2008 (7).

* cited by examiner

*Primary Examiner* — Lee D Wilson
(74) *Attorney, Agent, or Firm* — Armstrong Teasdale LLP

(57) ABSTRACT

A method for fabricating a plurality of turbine components is provided. The method includes removably coupling at least one tab to a plate, wherein the at least one tab and the plate each include a plurality of apertures extending therein. The at least one tab is removably coupled to a first turbine component, and a tool is removably coupled to the plate such that the plate and the at least one tab substantially align the tool with respect to the first turbine component. The method further includes performing a fabrication operation on the first turbine component. The at least one tab is re-oriented with respect to the plate, and the at least one tab is removably coupled to a second turbine component. The tool is removably coupled to the plate such that the plate and the at least one tab substantially align the tool with respect to the second turbine component, and a fabrication operation is performed on the second turbine component.

13 Claims, 4 Drawing Sheets

METHOD AND APPARATUS FOR FABRICATING A PLURALITY OF TURBINE COMPONENTS

BACKGROUND OF THE INVENTION

This invention relates generally to mounting fixtures, and more specifically to a mounting fixture used to fabricate a plurality of different turbine engine components.

In known turbine engines, sometimes it is necessary to form openings that extend through a portion of the turbine. For example, sometimes is it necessary to drill openings through vertical flanges extending from a turbine casing. To drill horizontally, the drilling assembly must first be secured into position relative to the flange. To prevent movement of the turbine during the drilling, dowels are inserted through pre-formed apertures defined in the flanges. However, it may be difficult to secure the same drilling assembly to different engines, as the turbine engines may be sized differently, i.e. with different arc lengths, bolt spacings, and bolt radii, for example. Moreover, even within the same turbine such dimensions may vary from one portion of the engine to another portion of the turbine.

To align the drilling assembly with a portion of the turbine, at least some drilling assemblies use a mounting fixture. At least some known mounting fixtures are unitarily fabricated and are sized to enable the fixture to be coupled to the casing. As such, generally, a different fixture is needed for each different size of turbine or for each area of the engine. For example, a first fixture may be used on a portion of the casing formed with a first bolt spacing and a second fixture may be required on those portions of the casing formed with a second bolt spacing. In another example, one fixture is sized for use with a turbine rated for a first operation, while another fixture must be configured for use with a turbine rated for a second operation.

In one known fabrication method used to form apertures in a casing flange, several mounting fixtures with varying dimensions and configurations must be used to complete one drilling job. As such, several mounting fixtures unique to that turbine must be fabricated. Such requirements increase the costs and time of the aperture fabrication process. Furthermore, known fixtures are typically fabricated from solid steel, and, as such, may be awkward to move around and may be a hazard to those working with the fixtures.

BRIEF DESCRIPTION OF THE INVENTION

In one aspect, a method for fabricating a plurality of turbine components is provided. The method includes removably coupling at least one tab to a plate, wherein the at least one tab and the plate each include a plurality of apertures extending therein. The at least one tab is removably coupled to a first turbine component, and a tool is removably coupled to the plate such that the plate and the at least one tab substantially align the tool with respect to the first turbine component. The method further includes performing a fabrication operation on the first turbine component. The at least one tab is re-oriented with respect to the plate, and the at least one tab is removably coupled to a second turbine component. The tool is removably coupled to the plate such that the plate and the at least one tab substantially align the tool with respect to the second turbine component, and a fabrication operation is performed on the second turbine component.

In another aspect, a mounting fixture for use with a plurality of turbine components is provided. The mounting fixture includes a plate having a plurality of apertures defined therein. The plate is removably coupled to a tool. The mounting fixture further includes at least one tab having a plurality of apertures defined therein. At least one fastener is configured to removably couple the at least one tab to the plate in an orientation based on a first turbine component to be fabricated. The fastener is further configured to enable the at least one tab to be re-oriented with respect to the plate based on a second turbine component to be fabricated.

In a still further aspect, an assembly for fabricating a plurality of turbine components is provided. The assembly includes a plate having a plurality of apertures defined therein. The plate is removably coupled to a tool. The assembly further includes at least one tab having a plurality of apertures defined therein. The tab is removably coupled to the plate. The at least one tab is removably coupled to the plate in a first position configured for removably coupling the at least one tab to a first turbine component to be fabricated, and the at least one tab is removably coupled to the plate in a second position configured for removably coupling the at least one tab to a second turbine component to be fabricated.

DETAILED DESCRIPTION OF THE INVENTION

Figure 1:
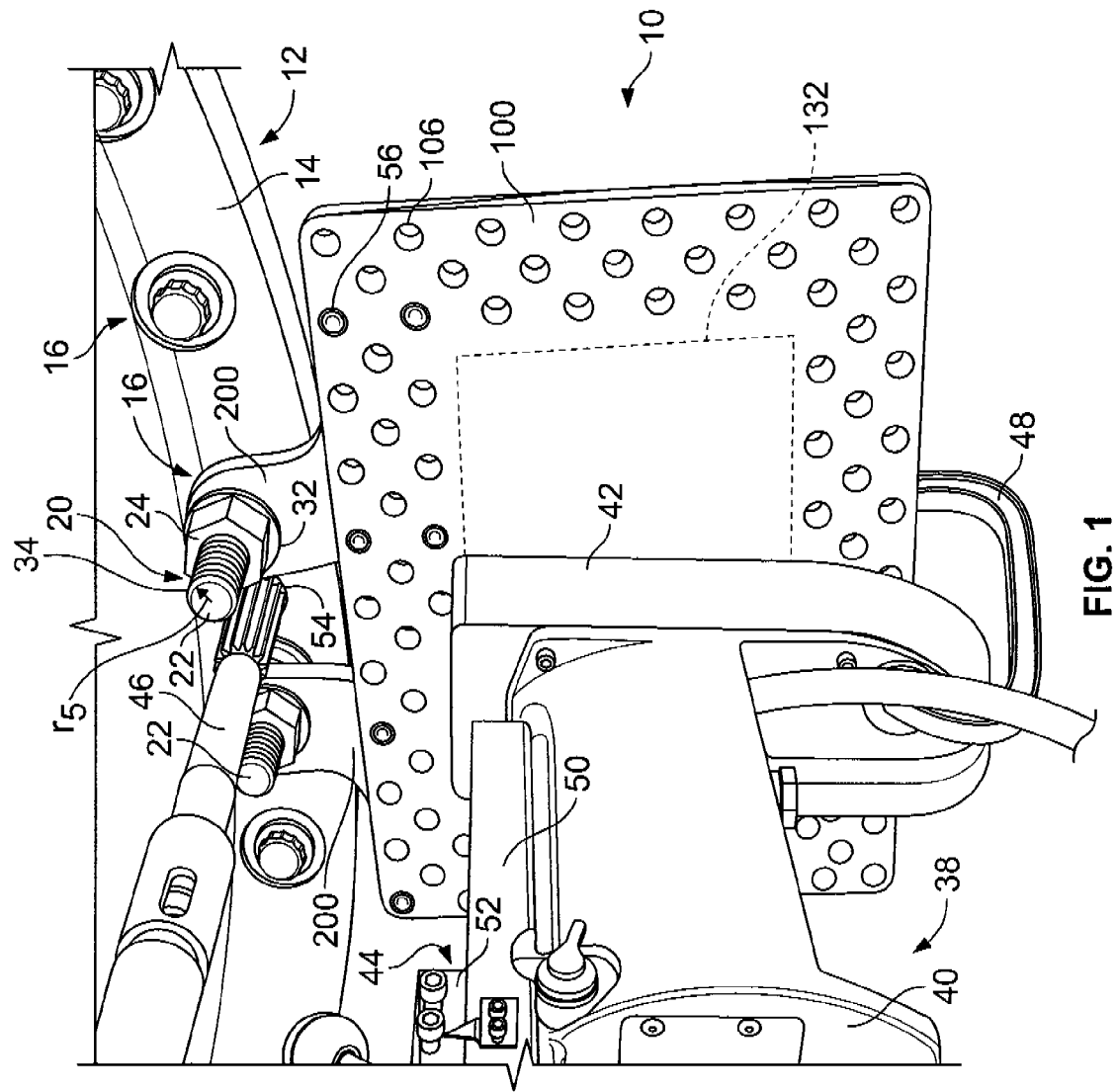
FIG. 1 is a front perspective view of an exemplary mounting fixture coupled to a turbine engine.
Figure 2:
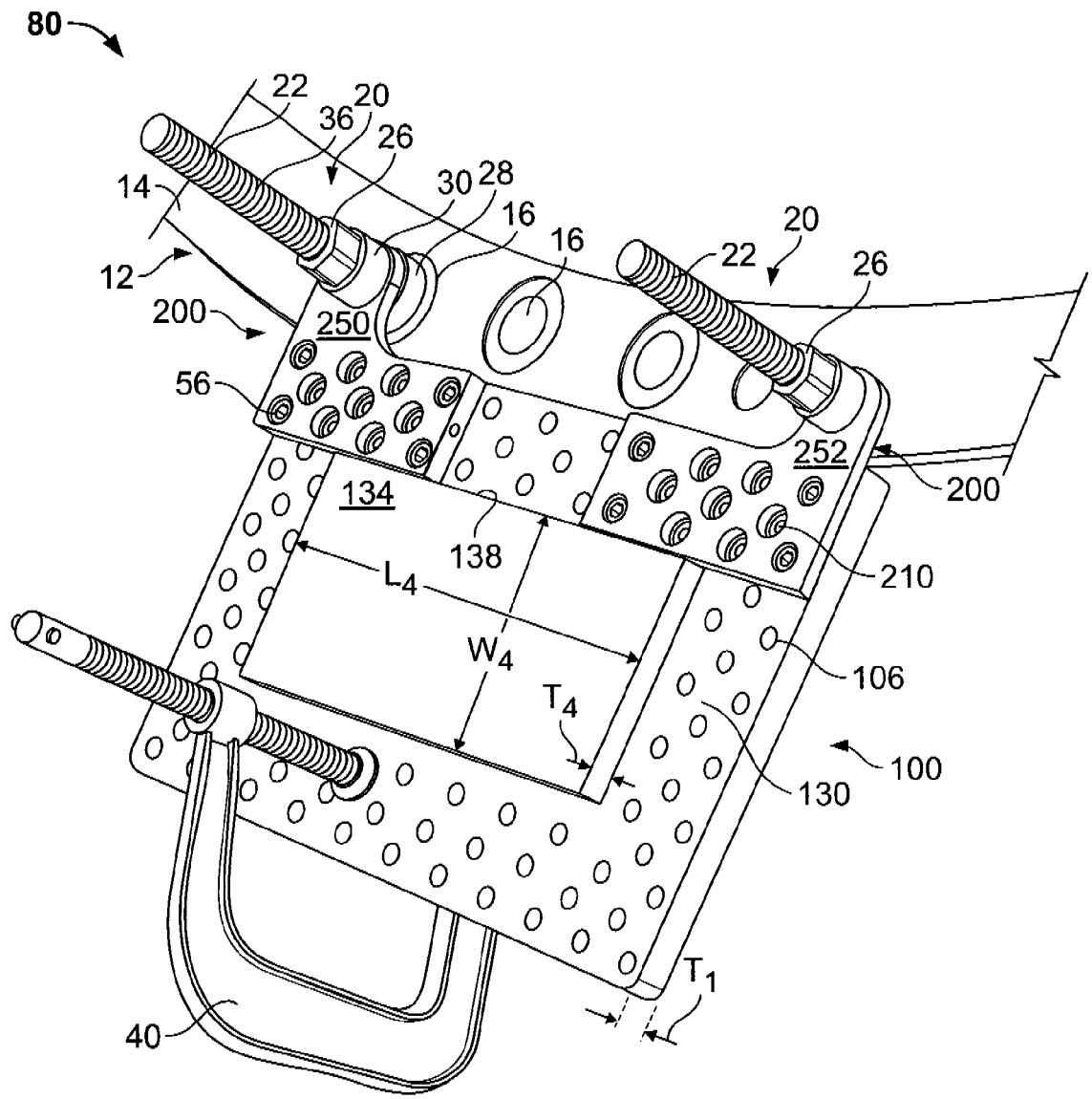
FIG. 2 is a back perspective view of an alternative exemplary mounting fixture coupled to a turbine engine.

FIG. 1 shows a front perspective view of an exemplary embodiment of a mounting fixture 10 coupled to a turbine component 12, such as, for example, a turbine casing, a turbine flange, a turbine rotor, a turbine rotor disk, a duct within a turbine, and/or any other suitable turbine component that would enable mounting fixture 10 to function as described herein. FIG. 2 shows a back perspective view of an alternative mounting fixture 80 coupled to turbine component 12. Components of mounting fixture 80 are similar to component of mounting fixture 10, and like components are identified with like reference numerals. More specifically, mounting fixture 10 and mounting fixture 80 are essentially similar except for the orientation of tabs 200 and the orientation of fixture 10 or 80 with respect to turbine component 12. Mounting fixture 10 will be described for exemplary purposes, but it should be understood that mounting fixture 80 has an essentially similar description and essentially similar characteristics to mounting fixture 10, as described herein.

In the exemplary embodiment, mounting fixture 10 includes a mounting plate 100 and a pair of mounting tabs 200. Alternatively, more or less than two tabs 200 may be used with mounting fixture 10. Furthermore, in the exemplary embodiment, mounting fixture 10 is fabricated from a metallic material. More specifically, in the exemplary embodiment, mounting fixture 10 is fabricated from steel or any other suitable material, such as, but not limited to, a magnetic material, a high tensile material, a high fatigue limit material, and/or a material having a high modulus of elasticity.

In the exemplary embodiment, mounting fixture 10 is coupled to a first turbine component, such as a casing 12. As shown in the exemplary embodiment, casing 12 includes a flange 14 that is oriented substantially perpendicularly to the ground (not shown). Flange 14 includes a plurality of apertures 16 extending therethrough. In the exemplary embodiment, mounting fixture 10 may be coupled to a plurality of turbine components (not shown) other than casing flange 14, such as, but not limited to, a flange that is different from flange 14. Specifically, in the exemplary embodiment, as described in more detail below, mounting fixture 10 is configured to be removably coupled to a plurality of different turbine components.

In the exemplary embodiment, mounting fixture 10 is removably coupled to flange 14 using mounting tabs 200 and dowel assemblies 20. Each dowel assembly 20, in the exemplary embodiment, includes a rod 22, a front nut 24, a back nut 26, a first spacer 28, a second spacer 30, and a washer 32. More specifically, each rod 22 extends through an aperture 16. Washer 32 and front nut 24 are threadably coupled to a front end 34 of rod 22. First spacer 28 is coupled to a back end 36 of rod 22 such that rod 22 is inserted through spacer 28. Mounting plate tabs 200 are coupled to rods 22 such that first spacer 28 is positioned between tabs 200 and flange 14. Second spacer 30 and back nut 26 are coupled similarly to rod back end 36. Front and back nuts 24 and 26 are tightened such that dowel assembly 20 and mounting fixture 10 are secured in position relative to flange 14. Alternatively, mounting fixture 10 is removably coupled to a turbine component using any other suitable means (not shown).

In the exemplary embodiment, mounting fixture 10 is also coupled to a drill assembly 38. Alternatively, any other suitable type of tool, such as, but not limited to, a electrical discharge machining tool, a laser tool, a grinding tool, an electrochemical machining tool, a reaming tool, and/or a cutting tool, may be coupled to mounting fixture 10. In the exemplary embodiment, drill assembly 38 includes a base 40, a magnetic plate 42, a track assembly 44, and a drill 46. Base 40 is coupled to magnetic plate 42, which magnetically couples base 40 to mounting fixture 10. More specifically, magnetic plate 42 couples to mounting plate 100 of mounting fixture 10. In the exemplary embodiment, a clamp 48 is used to secure drill assembly 38 to mounting fixture 10. Furthermore, in the exemplary embodiment, base 40 includes track assembly 44. In the exemplary embodiment, track assembly 44 includes a base track 50 and a drill track 52. Base track 50 is interconnected with drill track 52 such that a relative position of drill 46 with respect to flange 14 may be changed by moving drill track 52 with respect to base track 50.

During use, in the exemplary embodiment, mounting fixture 10 is assembled by removably coupling tabs 200 to plate 100 to enable fixture 10 to be coupled to the first turbine component, as described in more detail below. Specifically, each tab 200 is coupled to flange 14 using a dowel assembly 20. Drill assembly 38 is positioned with respect to casing 12 by first positioning magnetic plate 42 with respect to plate 100, and then magnetically coupling drill assembly 38 to mounting fixture 10 to enable drill 46 to be aligned relative to flange 14. Clamp 48 tightens to secure base 40 and magnetic plate 42 to mounting plate 100. Drill track 52 is moved with respect to base track 50 to position drill 46 adjacent to flange 14. Operation of drill 46 fabricates apertures 54 extending through flange 14 as drill 46 is moved along track assembly 44 towards flange 14.

Figure 3:
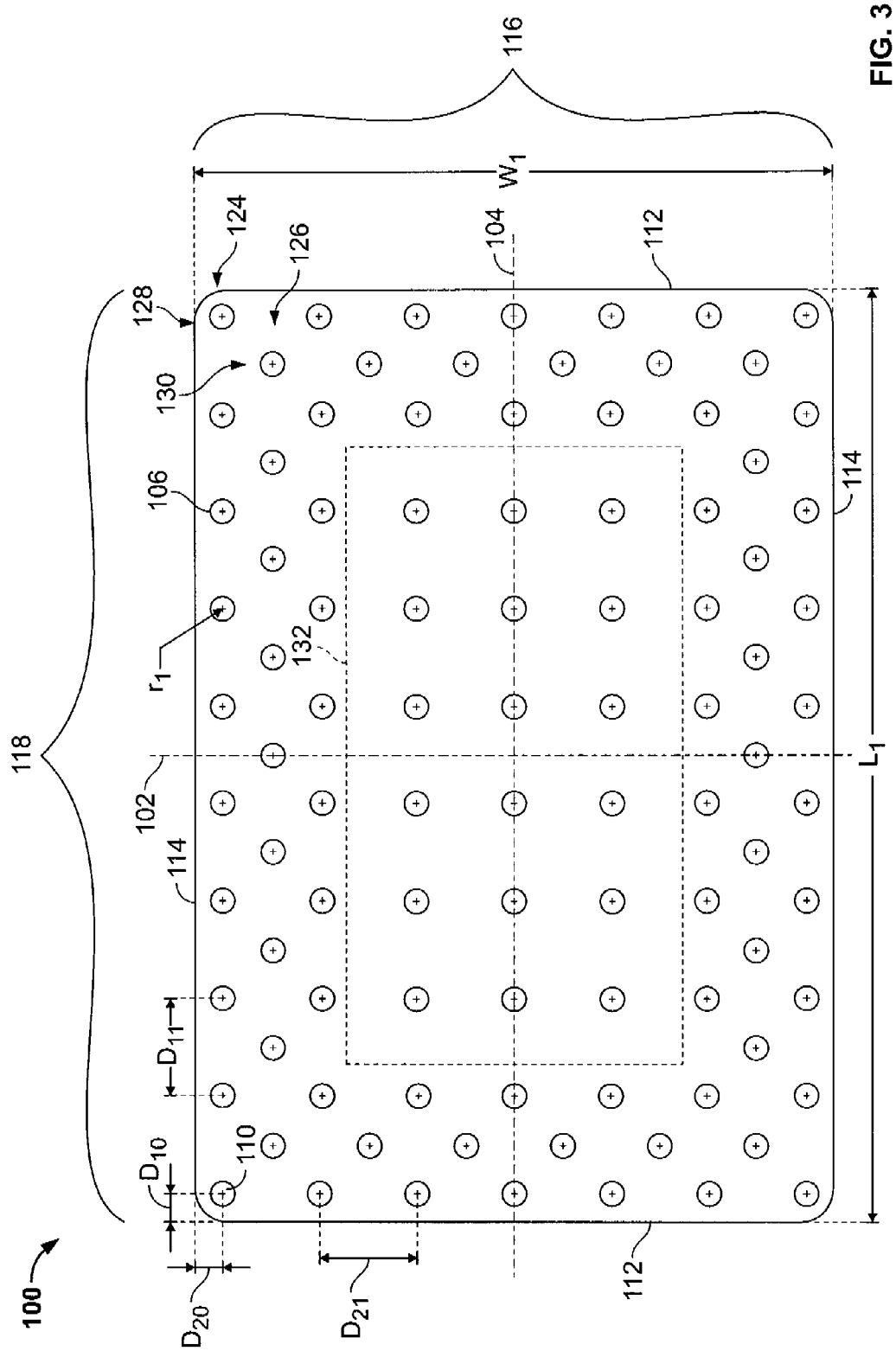
FIG. 3 is a plan view of a mounting plate that may be used with the mounting fixture shown in FIG. 1.
Figure 4:
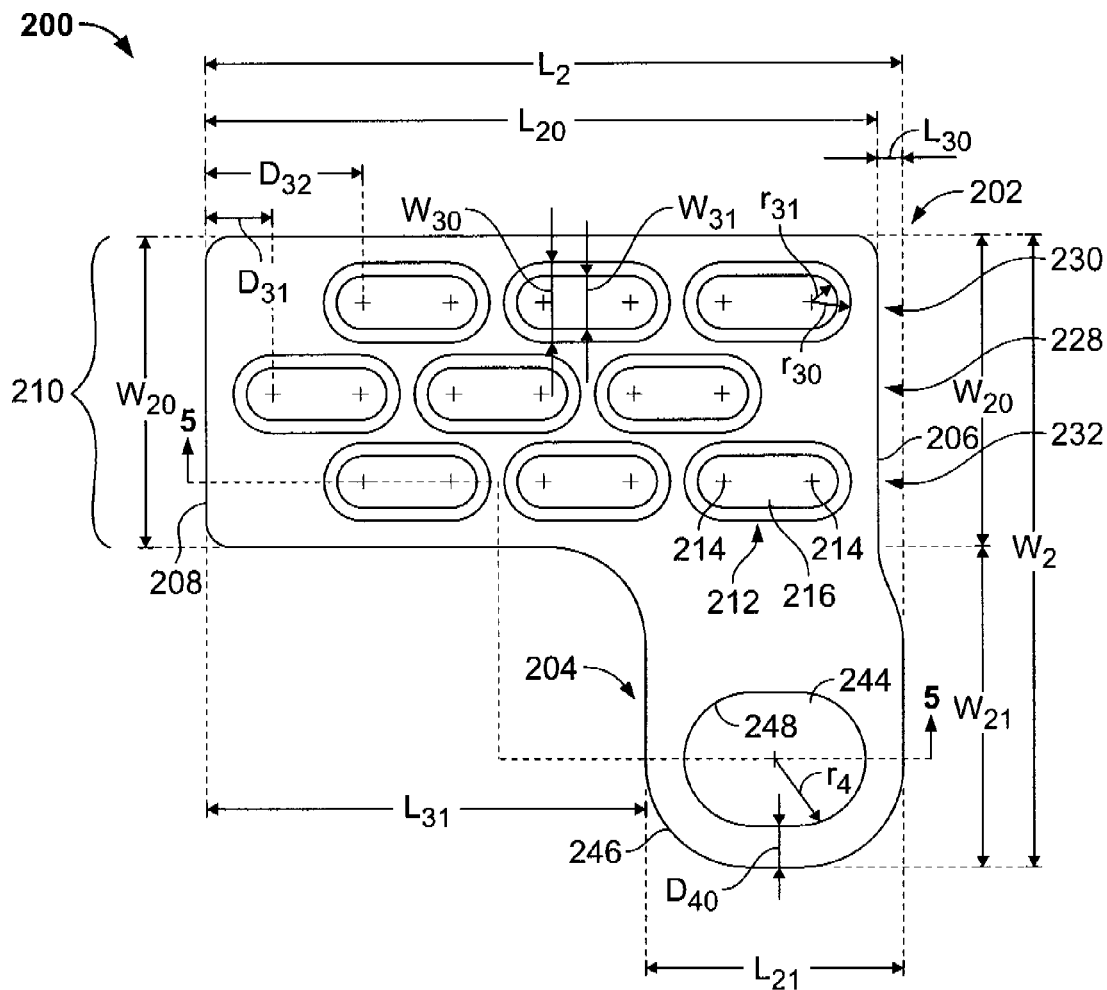
FIG. 4 is a plan view of an exemplary tab that may be used with the mounting fixture shown in FIG. 1.
Figure 5:
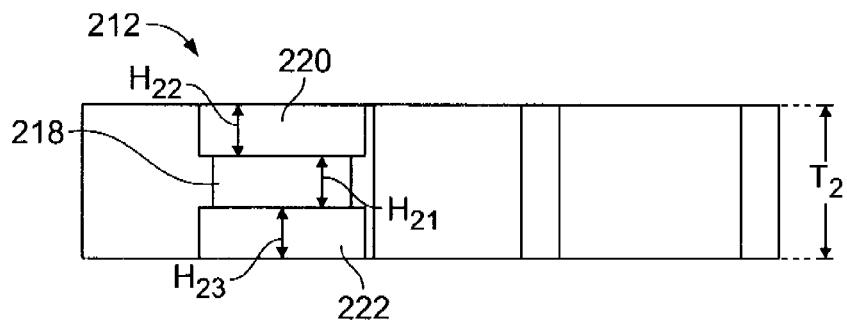
FIG. 5 is a cross-sectional view of the tab shown in FIG. 4 and taken along line 5-5.

FIG. 3 is a plan view of mounting plate 100. FIG. 4 is a plan view of tab 200. FIG. 5 is a cross-sectional view of tab 200 taken along line 5-5. In the exemplary embodiment, plate 100 and tab 200 are each fabricated from a metallic material or any other suitable material, as described herein.

In the exemplary embodiment, plate 100 has a thickness $T_1$ (shown in FIG. 2), a width $W_1$, and a length $L_1$. In the exemplary embodiment, length $L_1$ is longer than width $W_1$. Alternatively, length $L_1$ may be equal to, or shorter than, width $W_1$. Furthermore, in the exemplary embodiment, plate 100 is symmetric about a pair of center lines 102 and 104. Plate 100 includes plurality of apertures 106 defined therein. In the exemplary embodiment, each aperture 106 is substantially circular and has a radius $r_1$ that is substantially constant through plate 100. Alternatively, apertures 106 may be formed with a plurality of different radii (not shown). In an alternative embodiment, each aperture 106 includes a countersunk portion (not shown). In another alternative embodiment, the radius $r_1$ of each aperture 106 varies throughout plate 100.

In the exemplary embodiment, apertures 106 are substantially equi-spaced such that a distance $D_{10}$ between a corner aperture 110 and a plate width side 112 is approximately equal to a distance $D_{20}$ between corner aperture 110 and a plate length side 114. Alternatively, apertures 106 may be arranged with non-equidistant spacing. In the exemplary embodiment, apertures 106 are arranged into at least one row 116 and at least one column 118. More specifically, in the exemplary embodiment, plate 100 includes a plurality of rows 116 and a plurality of columns 118 of apertures 106. In each row 116, a distance $D_{11}$ separates each pair of adjacent apertures 106. In each column 118, a distance $D_{21}$ separates each pair of adjacent apertures 106. In the exemplary embodiment, distance $D_{11}$ is approximately equal to distance $D_{21}$. Alternatively, distance $D_{11}$ may be any distance that is not equal to distance $D_{21}$.

In the exemplary embodiment, within each row 116, each aperture 106 is spaced by distance $D_{11}$ and within each column 118, each aperture 106 is spaced by distance $D_{21}$. Alternatively, each row 116 may be formed with a different distance defined between each aperture 106, and each column 118 may be formed with a different spacing between each aperture 106. In an alternative embodiment, adjacent rows 116 may have a different spacing between apertures 106, and/or adjacent columns 118 may have a different spacing between apertures 106. Further, in the exemplary embodiment, adjacent rows 116 are staggered such that a first row 124 is offset and staggered from an adjacent row 126. Similarly, in the exemplary embodiment, adjacent columns 118 are staggered such that a first column 128 is offset and staggered from an adjacent column 130. In an alternative embodiment, plate 100 may be formed with any number of rows 116 and/or columns 118. In another alternative embodiment, apertures 106 may be oriented in any pattern that enables plate 100 to function as described herein.

In the exemplary embodiment, one row 116 is substantially aligned with center line 104, and one column 118 is substantially aligned with center line 102. More specifically, in the exemplary embodiment, at least one aperture 106 in at least one row 116 is substantially bisected by center line 104, and at least one aperture 106 in at least one column 118 is substantially bisected by center line 102. Alternatively, apertures 106 are aligned such that an aperture is other than bisected by center line 104 and/or center line 102.

In an alternative embodiment, plate 100 includes a center area 132 that does not include any apertures 106 defined therethrough (shown in FIG. 1). Furthermore, in the exemplary embodiment, plate 100 includes a backside platform 134 (shown in FIG. 2). More specifically, platform 134 extends from a back surface 136 of plate 100 and has a thickness $T_4$, a length $L_4$, and a width $W_4$. In the exemplary embodiment, platform 134 is solid and does not include any apertures 106 defined therethrough. Alternatively, platform 134 may include apertures 106 defined therethrough. In addition, in the exemplary embodiment, platform 134 is sized to enable tabs 200 to contact a side 138 of platform 134 when tabs 200 are coupled to plate 100. Alternatively, when tabs 200 are coupled to plate 100, tabs 200 do not contact platform 134.

In the exemplary embodiment, each tab 200 includes a body portion 202 and a tab portion 204. More specifically, in the exemplary embodiment, body portion 202 and tab portion 204 are constructed unitarily together, and each tab 200 has a substantially uniform thickness $T_2$. Alternatively, the thickness $T_2$ of each tab 200 may vary across tab body portion 202 and/or tab extension portion 204. Tab 200 has an overall length $L_2$ and an overall width $W_2$. In the exemplary embodiment, body portion 202 has a length $L_{20}$ and a width $W_{20}$, and tab portion 204 has a length $L_{21}$ and a width $W_{21}$.

In the exemplary embodiment, length $L_{21}$ is shorter than $L_2$ and $L_{20}$. More specifically, in the exemplary embodiment, tab portion 204 is offset from a right side 206 of body portion 202 by a length $L_{30}$. Furthermore, in the exemplary embodiment, tab portion 204 is also offset from a left side 208 of body portion 202 by a length $L_{31}$. Alternatively, tab portion 204 may be oriented substantially flush with right side 206, substantially flush with left side 208, or at any location therebetween. In another embodiment, length $L_{21}$ is approximately equal to $L_{20}$, and/or to length $L_2$.

In the exemplary embodiment, body portion 202 includes a plurality of apertures 210 defined therein. More specifically, in the exemplary embodiment, each aperture 210 is an elliptical slot 212 that includes two semi-circular ends 214 coupled together by a center portion 216. Each slot 212 includes an opening 218 that extends between a first recessed portion 220 and a second recessed portion 222. Opening 218 has a height $H_{21}$, first recessed portion 220 has a height $H_{22}$, and second recessed portion 222 has a height $H_{23}$. In the exemplary embodiment, heights $H_{21}$, $H_{22}$, and $H_{23}$ are approximately equal. Alternatively, any of heights $H_{21}$, $H_{22}$, and/or $H_{23}$ may be different from other heights $H_{21}$, $H_{22}$, and/or $H_{23}$.

In the exemplary embodiment, semi-circular ends 214 are each formed with a first radius $r_{30}$ within first and second recessed portions 220 and 222, respectively, and a second radius $r_{31}$ within opening 218. Similarly, center portion 216 has a first width $W_{30}$ within first and second recessed portions 220 and 222, respectively, and a second width $W_{31}$ within opening 218. More specifically, width $W_{30}$ is approximately twice as large as radius $r_{30}$, and width $W_{31}$ is approximately twice as large as radius $r_{31}$ such that semi-circular ends 214 and center portion 216 are substantially aligned. Alternatively, slots 212 may be configured and/or oriented in any other suitable configuration and/or orientation.

In the exemplary embodiment, slots 212 are arranged in a first row 228 or in a staggered row 230 or 232. Each first row 228 is offset from body left side 208 by a distance $D_{31}$. Each staggered row 230 and 232 is offset from body left side 208 by a distance $D_{32}$. In the exemplary embodiment, distance $D_{31}$ is less than distance $D_{32}$. Alternatively, rows 230 and 232 are oriented in a pattern wherein slots 212 and equi-spaced such that distance $D_{31}$ is approximately equal to distance $D_{32}$. Although only three rows 228, 230, and 232 are shown in the exemplary embodiment, alternatively body portion 202 may include any other suitable number of rows 228, 230, and 232 that enables tab 200 to function as described herein.

In the exemplary embodiment, tab extension portion 204 includes an aperture 244 defined therethrough. More specifically, in the exemplary embodiment, aperture 244 is sized to enable tab 200 to be coupled to a plurality of different turbine components. For example, in the exemplary embodiment, aperture 244 is sized to at least receive rod 22 of dowel assembly 20 therethrough. Specifically, aperture 244 has a radius $r_4$ that is larger than a radius $r_5$ (shown in FIG. 1) of rod 22.

Furthermore, in the exemplary embodiment, an outer edge 246 of tab portion 204 is contoured with a shape that substantially mirrors a contour of a portion of aperture 244. Outer edge 246 is spaced a distance $D_{40}$ from an outer edge 248 of aperture 244 to enable tab portion 204 to facilitate withstanding stresses that may be induced to tab 200 when a turbine component is tooled.

To assemble mounting fixture 10 for use with a first turbine component, such as, for example, with casing flange 14, in the exemplary embodiment, at least one tab 200 is coupled to plate 100. The number and relative locations of tabs 200 coupled to plate 100 is variable depending on the dimensions and configuration of the first turbine component. More specifically, in the exemplary embodiment, two tabs 200 are coupled to plate 100 along one plate length side 114. Although the exemplary embodiment includes two tabs 200 positioned along length side 114, tabs 200 may be coupled to plate 100 in any other suitable configuration to enable mounting fixture 10 to be coupled to a plurality of different turbine components. For example, more or less than two tabs 200 may be coupled along any side 112 and/or 114 of plate 100. In another exemplary embodiment, a first tab 200 is coupled along plate side 112 and at least one other tab 200 is coupled along plate side 114. In a further embodiment, a plurality of tabs 200 are coupled to width side 112.

In the exemplary embodiment, tabs 200 may be coupled in any orientation with respect to plate 100, for example, tabs 200 may be oriented such that tab portions 204 are positioned generally near center line 102, as shown in FIG. 1, or such that tab portions 204 are positioned generally near sides 112, as shown in FIG. 2. Alternatively, one tab 200 may be oriented such that tab portion 204 is positioned generally near side 112, and the other tab 200 oriented such that its tab portion 204 is positioned generally near center line 102.

In the exemplary embodiment, tabs 200 are coupled to plate 100 using a plurality of fasteners 56 (shown in FIGS. 1 and 2). Fasteners 56 are sized for insertion through a tab aperture 210 and into one of the plate apertures 106. More specifically, in the exemplary embodiment, a fastener length (not shown) is selected to enable the fastener 56 to withstand stresses induced during a tooling operation. In the exemplary embodiment, when fastener 56 is loosened, slots 212 enable tab 200 to be slidably adjusted to facilitate optimally positioning tab 200 with respect to the plate 100 and to the first turbine component. After, tab 200 is positioned with respect to plate 100, fastener 56 is tightened within slot 212 to secure tab 200 to plate 100.

In the exemplary embodiment, each fastener 56 is configured such that a fastener head (shown but not numbered) is received in one of tab recessed portions 220 or 222, and a nut (not shown) is received in the other tab recessed portion 220 or 222. Alternatively, either the fastener head or the nut is only received in one of recessed portions 220 or 222. In the exemplary embodiment, recessed portions 220 and 222 are oriented such that when either tab face 250 or 252 (shown in FIG. 2) is positioned between tab 200 and plate 100, the fastener head may still be received within a recessed portion 220 or 222. As such, recessed portions 220 and 222 facilitate increasing the positionability of tabs 200 with respect to plate 100.

Once mounting fixture 10 is assembled, fixture 10 is coupled to the first turbine component using dowel assemblies 20, for example. A tool, such as, for example, drill assembly 38, may then be coupled to mounting fixture 10, as described above, to facilitate fabrication of the first turbine component.

To use mounting fixture 10 with a second turbine component (not shown), such as, for example, a turbine casing, a second turbine flange, a turbine rotor, a turbine rotor disk, a duct within a turbine, and/or any other suitable turbine component, in the exemplary embodiment, drill assembly 38 is uncoupled from mounting fixture 10, and mounting fixture 10 is uncoupled from the first turbine component. Each of the plurality of fasteners 56 is removed from each tab aperture 210 such that tabs 200 are removed from plate 100. Tabs 200 are then re-oriented with respect to plate 100, if necessary, such that the new configuration of mounting fixture 10 substantially corresponds to the dimensions and configuration of the second turbine component. Tabs 200 are secured to plate 100 using fasteners 56, and mounting fixture 10 is coupled to the second turbine component, as described above. As such, mounting fixture 10 may be used with a plurality of turbine components.

The above-described method and apparatus enable a plurality of different gas turbine components to be fabricated without requiring the use of a plurality of different mounting fixtures. More specifically, the mounting fixture described herein may be utilized for almost any size turbine component or dowel and/or bolt configuration. Because tabs are re-orientable, re-positionable, and removably coupled with respect to a mounting plate, a universal mounting fixture is provided that facilitates a plurality of turbine components being fabricated without requiring a plurality of mounting fixtures. The configuration of the tabs accommodates a plurality of bolting sizes for gas turbine engines. Moreover, because the tabs may be formed from hardened steel, the tabs withstand the stresses induced during tooling operations. The pattern of apertures defined through the mounting plate enables the tabs to be easily oriented such that mounting fixture can be coupled to virtually any configuration of a turbine component, such as, but not limited to, a turbine casing, a turbine flange, a turbine rotor, a turbine rotor disk, a duct within a turbine, and/or any other suitable turbine component that would enable the mounting fixture to function as described herein.

The mounting fixture is configurable to accommodate a plurality of different turbine dimensions and configurations, so a separate mounting fixture is not required for each turbine dimension and configuration. Because each mounting fixture as described herein may be used with a plurality of different turbine components, the quantity of mounting fixtures available for fabricating a component is facilitated to be increased in comparison to having mounting fixtures fabricated for use with only one turbine component dimension and/or configuration. Furthermore, because both the tabs and the plate have a plurality of apertures defined therethrough, the weight of the mounting fixture is facilitated to be reduced in comparison to mounting plates formed without a plurality of apertures. As such, shipping costs associated with transporting the mounting fixtures is facilitated to be reduced. Further, because the weight of the mounting fixture is facilitated to be reduced, the safety of an individual handling the mounting fixture is facilitated to be increased.

Exemplary embodiments of a method and apparatus for mounting a tool are described above in detail. The apparatus is not limited to the specific embodiments described herein, but rather, components of the method and apparatus may be utilized independently and separately from other components described herein. For example, the mounting fixture may also be used in combination with other components to be tooled, and is not limited to practice with only gas turbine engine components as described herein. Rather, the present invention can be implemented and utilized in connection with many other fabrication applications.

While the invention has been described in terms of various specific embodiments, those skilled in the art will recognize that the invention can be practiced with modification within the spirit and scope of the claims.

What is claimed is:

1. A mounting fixture for use with a plurality of turbine components, said mounting fixture comprising:
   a plate comprising a plurality of apertures defined therein, said plate is removably coupled to a tool;
   at least one tab comprising a body portion removably coupled to said plate and a tab portion extending outwardly from said body portion, said body portion comprising a plurality of slots defined therein, said tab portion comprising at least one aperture configured to couple said mounting fixture to a turbine component; and
   at least one fastener configured to removably couple said at least one tab to said plate in an orientation based on a first turbine component to be fabricated, said fastener further configured to enable said at least one tab to be re-oriented with respect to said plate based on a second turbine component to be fabricated.

2. A mounting fixture in accordance with claim 1 wherein said mounting fixture further comprises a plurality of said tabs removably coupled to said plate using a plurality of said fasteners.

3. A mounting fixture in accordance with claim 1 wherein said tab portion further comprises at least one aperture configured to couple to at least one fastener that extends outward from at least one of said first turbine component and said second turbine component.

4. A mounting fixture in accordance with claim 1 wherein each of said plurality of slots is substantially elliptical.

5. A mounting fixture in accordance with claim 4 wherein each of said slots comprises at least one recessed portion defined within a slot opening.

6. A mounting fixture in accordance with claim 1 wherein said at least one tab is removably coupled to a dowel, wherein said dowel is inserted through a portion of at least one of said plurality of turbine components.

7. An assembly used for fabricating a plurality of turbine components, said assembly comprising:
   a plate comprising a plurality of apertures defined therein, said plate is removably coupled to a tool; and
   at least one tab comprising a body portion removably coupled to said plate and a tab portion extending outwardly from said body portion, said body portion comprising a plurality of slots defined therein, said tab portion comprising at least one aperture configured to couple said plate to a turbine component;
   wherein said at least one tab is removably coupled to said plate in a first position configured for removably coupling said at least one tab to a first turbine component to be fabricated; and
   wherein said at least one tab is removably coupled to said plate in a second position configured for removably coupling said at least one tab to a second turbine component to be fabricated.

8. An assembly in accordance with claim 7 wherein said assembly comprises at least one fastener extending outward from at least one of said first turbine component and said second turbine component, said at least one tab coupled to at least said first turbine component and said second turbine component using said at least one fastener.

9. An assembly in accordance with claim 7 wherein said assembly comprises at least one fastener inserted through at least one of said plurality of tab slots and at least one of said plurality of plate apertures.

10. An assembly in accordance with claim 7 wherein said at least one tab is further configured to be removably coupled to a dowel inserted through a portion of at least one of said plurality of turbine components.

11. An assembly in accordance with claim 7 wherein each of said plurality of slots is substantially elliptical.

12. An assembly in accordance with claim 11 wherein each of said plurality of slots comprises at least one recessed portion defined within a slot opening.

13. An assembly in accordance with claim 7 wherein said plate is removably coupled a drill assembly to facilitate aligning the drill assembly with said plurality of turbine components.

\* \* \* \* \*